US 6,650,654 B1

(12) United States Patent
Batty et al.

(10) Patent No.: US 6,650,654 B1
(45) Date of Patent: Nov. 18, 2003

(54) EARLY PREAMBLE TRANSMISSION

(75) Inventors: Sean N. Batty, Bedfordshire (GB);
Anthony S. Rowell, Irchester (GB)

(73) Assignee: Texas Instruments Incorporated,
Dallas, TX (US)

(*) Notice: Subject to any disclaimer, the term of this patent is extended or adjusted under 35 U.S.C. 154(b) by 0 days.

(21) Appl. No.: 09/459,282

(22) Filed: Dec. 17, 1999

(51) Int. Cl.[7] .............................. H04L 12/413
(52) U.S. Cl. .......................... 370/445; 370/428
(58) Field of Search ............................... 370/332–334, 370/445, 428; 375/365; 714/811

(56) References Cited

U.S. PATENT DOCUMENTS

| | | | |
|---|---|---|---|
| 4,038,605 A | * | 7/1977 | Elder et al. ............ 375/365 |
| 4,736,370 A | | 4/1988 | Hirome et al. |
| 5,434,872 A | | 7/1995 | Petersen et al. |
| 6,169,731 B1 | * | 1/2001 | Stewart et al. ............ 370/332 |

OTHER PUBLICATIONS

An IEEE 802 CSMA/CD Controller for the 68000 and General Purpose Applications, Logan et al, Mini–Micro Conference Record, Nov. 8–11, 1983, San Francisco, CA.

* cited by examiner

Primary Examiner—Salvatore Cangialosi
(74) Attorney, Agent, or Firm—Tammy L. Williams; W. James Brady, III; Frederick J. Telecky, Jr.

(57) ABSTRACT

The present invention is a method of reducing latency in transmitting frames of data in a shared access media environment whereby the preamble of the next frame to be transmitted is transmitted while the data portion of the next frame to be transmitted is being retrieved. In another aspect, the early transmission of the preamble of the next frame is started no later than the time it normally takes to fetch and prepare the next frame for transmission less the time it takes to transmit the preamble.

8 Claims, 1 Drawing Sheet

EARLY PREAMBLE TRANSMISSION

TECHNICAL FIELD OF THE INVENTION

This invention relates generally to data communications and more particularly to a method, system and apparatus for communicating data over shared media access.

BACKGROUND OF THE INVENTION

A switch is a device that connects multiple LANs or LAN segments and filters, i.e., examining the packet to determine its destination, in accordance with the networking protocol and forwards packets between them. Ethernet is a popular networking protocol defined by IEEE 802.3x standards. In an Ethernet network, the packets of information are referred to as frames.

A media access controller (MAC) protocol is used to provide the data link layer of the Ethernet LAN system. The MAC protocol encapsulates a SDU (payload data) by adding a 14 byte header (Protocol Control Information (PCI)) before the data and appending a 4-byte (32-bit) Cyclic Redundancy Check (CRC) after the data.

The entire frame is then preceded by a small idle period (the minimum inter-frame gap, 9.6 microsecond ($\mu S$)) and a 8 byte preamble. The purpose of the idle time before transmission starts is to allow a small time interval for the receiver electronics in each of the nodes to settle after completion of the previous frame.

A node starts transmission by sending an 8 byte (64 bit) preamble sequence. This consists of 62 alternating 1's and 0's followed by the pattern 11. When encoded using Manchester encoding, the 62 alternating bits produce a 10 MHz square wave. The purpose of the preamble is to allow time for the receiver in each node to achieve lock of the receiver Digital Phase Lock Loop which is used to synchronize the receive data clock to the transmit data clock. At the point when the first bit of the preamble is received, each receiver may be in an arbitrary state (i.e. have an arbitrary phase for its local clock). During the course of the preamble it learns the correct phase, but in so doing it may miss (or gain) a number of bits. A special pattern (11), known as the start of frame delimiter, is therefore used to mark the last two bits of the preamble. When this is received, the Ethernet receive interface starts collecting the bits into bytes for processing by the MAC layer.

One method, although expensive to implement because of the cost of such memories, of decreasing the latency inherent is fetching and transmitting the next frame of data is to use faster memory. Another method, which is also not cost effective, is to use memory, i.e., enough memory to store both the currently transmitting frame and the next frame to be transmitted.

As transmission speeds increase there is an increasing need to find effective yet inexpensive ways to reduce latency inherent in retrieving and transmitting the next frame of data.

SUMMARY OF THE INVENTION

The present invention is a method of reducing latency in transmitting frames of data in a shared access media environment whereby the preamble of the next frame to be transmitted is transmitted while the data portion of the next frame to be transmitted is being retrieved. In another aspect of the invention, the early transmission of the preamble of the next frame is started no later than the time it normally takes to fetch and prepare the next frame for transmission less the time it takes to transmit the preamble.

These and other features of the invention that will be apparent to those skilled in the art from the following detailed description of the invention, taken together with the accompanying drawings.

DESCRIPTION OF THE DRAWINGS

FIG. 1(*b*) shows a timing diagram illustrating operation of a communications device in accordance with the present invention.

DETAILED DESCRIPTION OF THE INVENTION

The present invention is method of reducing the latency inherent in retrieving and transmitting the next frame of data. The present invention accomplishes this by taking advantage of the fact that the preamble portion of a frame of data is comprised of fixed data and thus starts transmission of the preamble for the next frame of data sooner than the time it would take to retrieve and prepare the next frame of data for transmission. Conventionally, transmission of the preamble of the next frame of data starts after the data to be transmitted is retrieved. With faster transmission devices, it becomes increasingly difficult to maintain a desired transmission rate because of the correspondingly decreased amount of time provided to fetch the next data.

Figure 1A:
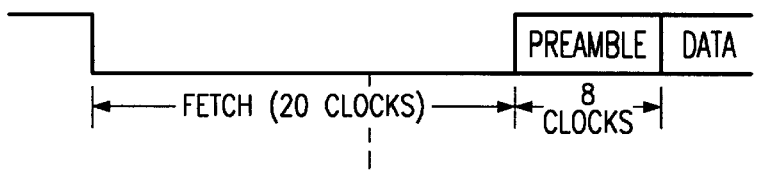
FIG. 1(*a*) is a timing diagram illustrating operation of prior art data transmission systems.
Figure 1B:
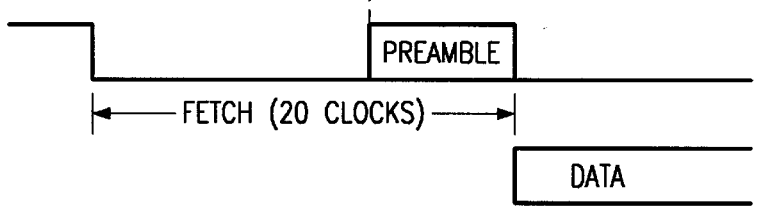

Thus, as the transmission of a frame of data is completed, a determination is made as to whether or not the current frame of data is to be resent (i.e., because of some error during transmission) or whether the next frame of data is to be sent. Currently, as shown in FIG. 1(*a*), it takes about twenty (20) clock cycles to fetch the next frame of data and prepare to send it. As noted hereinabove, however, the because the first part of each frame is the same (i.e., it is known even before it is retrieved), the present invention, as illustrated in FIG. 1(*b*), provides for the transmission of the next frame of data to start at a time after the completion of the transmission of the previous frame which is less than the time it takes to retrieve and prepare the next frame for transmission. As an example, transmission of the next frame starts no more than twelve (12) clock cycles after the end of the transmission of the previous frame which is much less than the time it would take to retrieve and prepare the next frame for transmission.

Figure 2:
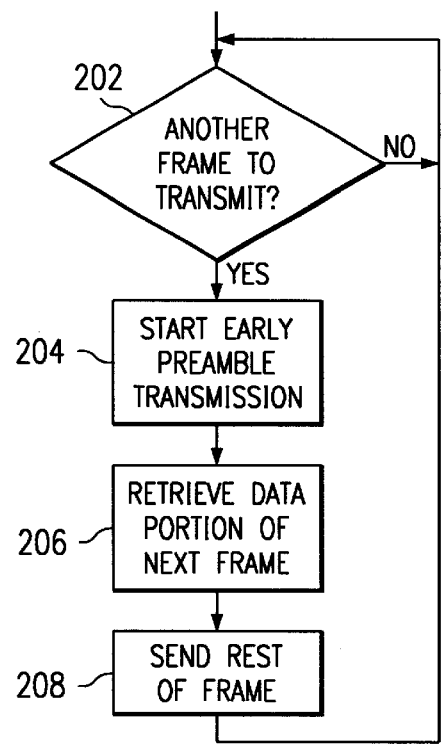
FIG. 2 is a flow diagram illustrating operation of a communications device in accordance with the present invention.

The operation of a data communications device in accordance with the present invention is shown generally in FIG. 2. At decision block 202, if there is another frame of data to transmit, processing continues at block 204 where early transmission of the preamble starts. If there is not another frame of data to transmit at decision block 202, the process at decision block continues until another transmission of another frame is needed. Returning to block 204, processing then continues at block 206 where the data portion of the next frame to be transmitted is retrieved. Once the data is retrieved, processing continues at block 208 where the rest of the frame is transmitted. Returning to FIG. 1(*b*), the present invention provides that the delay between the end of transmission of the previous frame and the start of preamble transmission for the next frame, when added together with the time it takes to transmit the preamble, is no greater than the time it takes to retrieve the data portion of the next frame.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of reducing latency in a data communications system comprising the steps of:
   (a) at a predetermined time before transmission of a previous frame is completed, generating a next frame to be transmitted;
   (b) transmitting a first portion of the next frame to be transmitted before the generating step is completed;
   (c) retrieving a next portion of said next frame to be transmitted;
   (d) transmitting said next portion of said next frame to be transmitted; and
   (e) repeating steps (c) and (d) until all of said next frame is transmitted.

2. The method of claim 1 wherein said first portion of said next frame to be transmitted is a known preamble.

3. The method of claim 1 wherein said next portion of said next frame to be transmitted is a data portion of said next frame to be transmitted.

4. The method of claim 1 wherein said predetermined time after transmission of said previous frame is no later than the time it takes to fetch and prepare the next frame for transmission less the time it takes to transmit the preamble.

5. The method of claim 2 wherein said next portion of said next frame to be transmitted is a data portion of said next frame to be transmitted.

6. The method of claim 2 wherein said predetermined time before transmission of said previous frame is no later than the time it takes to fetch and prepare the next frame for transmission less the time it takes to transmit the preamble.

7. The method of claim 3 wherein said predetermined time before transmission of said previous frame is no later than the time it takes to fetch and prepare the next frame for transmission less the time it takes to transmit the preamble.

8. The method of claim 5 wherein said predetermined time before transmission of said previous frame is no later than the time it takes to fetch and prepare the next frame for transmission less the time it takes to transmit the preamble.

* * * * *